US006982859B1

(12) United States Patent
Whitney

(10) Patent No.: US 6,982,859 B1
(45) **Date of Patent: *Jan. 3, 2006**

(54) INTEGRATED OVERCURRENT AND OVERVOLTAGE APPARATUS FOR USE IN THE PROTECTION OF TELECOMMUNICATION CIRCUITS

(75) Inventor: Stephen J. Whitney, Lake Zurich, IL (US)

(73) Assignee: Littelfuse, Inc., Des Plaines, IL (US)

( * ) Notice: Subject to any disclaimer, the term of this patent is extended or adjusted under 35 U.S.C. 154(b) by 188 days.

This patent is subject to a terminal disclaimer.

(21) Appl. No.: 09/649,195

(22) Filed: Aug. 28, 2000

Related U.S. Application Data

(63) Continuation-in-part of application No. 09/534,277, filed on Mar. 24, 2000.

(51) Int. Cl.
*H02H 3/22* (2006.01)

(52) U.S. Cl. ....................................... 361/111; 361/119

(58) Field of Classification Search ................ 361/103, 361/104, 111, 119, 124, 126, 127, 91.1, 91.5, 361/91.8, 93.8; 337/404, 28, 31, 34
See application file for complete search history.

(56) References Cited

U.S. PATENT DOCUMENTS

| | | | | |
|---|---|---|---|---|
| 4,467,308 A | | 8/1984 | Arikawa et al. | |
| 4,920,327 A | | 4/1990 | Arikawa et al. | |
| 5,214,406 A | | 5/1993 | Reese et al. | |
| 5,408,379 A | * | 4/1995 | Oguchi et al. | 361/55 |
| 5,675,468 A | * | 10/1997 | Chang | 361/119 |
| 5,699,032 A | | 12/1997 | Ulm, Jr. et al. | |
| 5,712,610 A | * | 1/1998 | Takeichi et al. | 337/290 |
| 5,977,860 A | | 11/1999 | Ulm, Jr. et al. | |
| 6,178,080 B1 | * | 1/2001 | Wilken et al. | 361/119 |
| 6,266,223 B1 | * | 7/2001 | Curry | 361/119 |
| 6,300,859 B1 | * | 10/2001 | Myong et al. | 337/182 |
| 6,377,435 B1 | * | 4/2002 | Nabell et al. | 361/119 |
| 6,407,901 B1 | * | 6/2002 | Casey et al. | 361/119 |
| 6,507,264 B1 | * | 1/2003 | Whitney | 337/159 |
| 6,510,032 B1 | * | 1/2003 | Whitney | 361/111 |
| 6,636,404 B1 | * | 10/2003 | Whitney et al. | 361/119 |

OTHER PUBLICATIONS

Harris Surgectors for Telecommunications System—pp. 10-149/10-156.

* cited by examiner

*Primary Examiner*—Gary L Laxton
(74) *Attorney, Agent, or Firm*—Bell, Boyd & Lloyd LLC

(57) ABSTRACT

An integrated overvoltage and overcurrent circuit protection device for use in telecommunication circuits. The integrated circuit protection device combines a overcurrent device such as a fuse and a overvoltage protection device such as a thyristor to respectively protect against overcurrent conditions and transient overvoltages. Integration of the two devices in a common package ensures proper coordination and matching of the components, reduces the final product cost and reduces the physical space required on a telecommunications circuit for overvoltage and overcurrent circuit protection.

31 Claims, 8 Drawing Sheets

INTEGRATED OVERCURRENT AND OVERVOLTAGE APPARATUS FOR USE IN THE PROTECTION OF TELECOMMUNICATION CIRCUITS

This application is a Continuation-In-Part of U.S. application Ser. No. 09/534,277, filed Mar. 24, 2000.

BACKGROUND OF THE INVENTION

The present invention relates to overvoltage and overcurrent protection apparatus for telecommunication circuitry and method of manufacturing same. In particular, the invention relates to fuses and thyristors.

Circuitry, particularly sensitive circuitry such as that found in telecommunication systems, require protection against both overcurrent and overvoltage conditions that may arise. Conditions such as short circuits may arise requiring an overcurrent protection device, such as a fuse, in order to prevent damage to circuitry.

Lightning is a common source of overvoltage in communication systems. Typically, communication systems consist of conductors in shielded cables suspended on poles or buried in the earth. The cable is made up of many conductors arranged in twisted pairs, commonly known as “Tip” and “Ring” lines for telephone systems, in particular. These cables are susceptible to transient energy from lightning and may conduct energy from the lightning to either a central office or subscriber equipment. Additionally, power sources for telecommunication systems are usually obtained from commercial power lines, which are also subject to excess energy from lightning that can, in turn, induce overvoltages in the telecommunication system being supplied by the power line.

Common approaches in the art to mitigate overcurrents and overvoltages include a combination of a fuse and a semiconductor overvoltage device such as a bi-directional thyristor, as shown in the circuit of FIG. 1. A fuse 100 is placed in series with a copper twisted pair 102 either in the Tip line 104 or in the Ring line 106. Hence, the fuse 100 protects the tip and ring wiring and also a bi-directional thyristor 110 from excessive energy in the event a continuous overvoltage is coupled to the wiring, as might occur if a power line falls across the wiring.

In order to limit overvoltage conditions, an overvoltage device such as the bi-directional thyristor 110 is connected across the twisted pair 102 in parallel with the telecommunication system 108. The thyristor 110 provides bi-directional “crow-bar” clamping of transients that may occur for either polarity. In particular, the thyristor 110 has a breakdown voltage at which a transient voltage exceeding this value will cause the thyristor 110 to begin clamping action across the lines 104 and 106. As the transient voltage attempts to rise higher, the current through the thyristor 110 will increase until a break-over voltage is reached. At this point, thyristor action is triggered and the thyristor 110 switches to its “on” or “latched” state. This is a very low impedance state that shunts or “crow-bars” the line, thereby suppressing the magnitude of the transient voltage. When the transient voltage diminishes, the thyristor 110 turns off and reverts to a high impedance “off” state.

The circuit of FIG. 1 is commonly used to protect “Tip” and “Ring” connections such as modems, telephones, facsimile machines, and line cards. While the circuit of FIG. 1 is appropriate for copper twisted pair environments, other voltage environments are also suitable for circuits sought to be protected such as alarm circuits, power supplies, remote sensors, CATV, data lines, etc.

The protection circuits used in telecommunication applications, such as that shown in FIG. 1, commonly utilize discretely packaged fuse and thyristor components connected in printed circuit wiring. The discrete component approach, however, requires that the components be properly coordinated and matched with one another in order to meet pertinent regulatory and safety agency requirements. Also, the discretely packaged components are typically sourced separately, thus adding increased cost to the final product. Furthermore, using discrete components consumes considerable physical space on a printed circuit board since two separate component packages must be placed on the printed circuit board.

SUMMARY OF THE INVENTION

There is a need for an improved circuit device that achieves both overcurrent and overvoltage protection in a discrete integral package to more easily assure coordination and matching of the overcurrent and overvoltage devices. In addition, there is a need for a discrete integral package approach that affords lower final product cost and reduces the physical space consumed in a printed circuit.

These and other advantages are provided by the present invention, where overcurrent and overvoltage protection devices are packaged in a common housing to form a single discrete circuit element that is substantially no larger than one of the overcurrent or overvoltage devices that are each discretely packaged as previously known in the art, such as a standard surface mount telecommunications fuse, for example.

In an embodiment, the present invention provides an integral circuit protection device providing overcurrent and overvoltage protection for a circuit that is configured to be connected to the circuit. The device includes an overcurrent protection portion, an overvoltage protection portion, and a plurality of terminals for connecting both the overvoltage and overcurrent protection portions of the integral circuit device to the circuit to be protected. Incorporation of both overvoltage and overcurrent devices into a single housing assures that these components are coordinated and matched for a particular application, lowers the total cost of the device since the components are not sourced separately and allows for smaller size by incorporating the devices into the same package.

In another embodiment the plurality of terminals includes first, second and third terminals with the overcurrent protection portion electrically connected between the first and second terminals and the overvoltage protection portion connected between the second and third terminals.

In another embodiment, the overcurrent protection portion includes a fuse.

In another embodiment, the overvoltage protection portion includes a bi-directional thyristor.

In another embodiment, the plurality of terminals of the integral circuit are configured to electrically connect the overcurrent protection portion in series with the circuit to be protected and to electrically connect the overvoltage protection portion in parallel with the circuit to be protected when the integral circuit device is electrically connected to the circuit to be protected.

In yet another embodiment, the integral circuit further includes a thermally conductive portion that conducts heat away from the overvoltage protection portion.

In an embodiment, thermal coefficients of the thermally conductive portion and overvoltage protection portion are substantially the same.

In an embodiment, the overvoltage protection portion is at least partially encapsulated with an atmospherically resistant material.

In another embodiment, the integral circuit device is configured for mounting on a printed circuit board.

In another embodiment, the integral circuit device is configured substantially the same as a standard telecommunications fuse configuration.

In yet another embodiment of the present invention, a circuit element is provided for overvoltage and overcurrent protection of a circuit. The circuit element includes a circuit element housing having first, second and third terminals. An overcurrent protection device is electrically connected between the first and second terminals and contained by the circuit element housing. In addition, an overvoltage protection device is electrically connected between the second and third terminals and also contained by the circuit element housing.

In an embodiment, the circuit element housing is comprised of a tube having an outer surface, an inner hollow portion, a first end and a second end. The overcurrent protection device is disposed within the inner hollow portion of the tube, the overvoltage protection device and the second terminal are disposed on the outer surface of the tube, the first terminal is disposed at the first end and the second terminal is disposed at the second end opposite from the first terminal.

In another embodiment, the first and second terminals include electrically conductive layers disposed on the outer surface of the tube adjacent to each of the first and second ends and extending into part of the inner hollow portion adjacent to the first and second ends. Additionally, conductive end caps respectively cover the electrically conductive layers and the first and second ends and electrically connected to the electrically conductive layers. The electrically conductive layers are also electrically connected to the overcurrent device disposed within the inner hollow portion of the tube.

In yet another embodiment, the third terminal is comprised of a conductive terminal disposed on the outer surface of the tube.

In another embodiment, a die bond pad disposed on the outer surface of the tube. A bond pad conductor is also disposed on the outer surface of the tube and electrically connected to at least one of the first and second conductive layers. A first conductor electrically connects the bond pad conductor to the die bond pad die bond pad and a second conductor electrically connects the third terminal to the die bond pad. A thyristor is disposed on the die bond pad and covered with an encapsulant material.

In an embodiment, the encapsulant material is atmospherically resistant and disposed such that the thyristor and the die bond pad on the outer surface of the tube are sealed to resist surrounding atmosphere.

In another embodiment, the thyristor disposed on the die bond pad is bonded to the die bond pad by a thermally conductive bonding material.

In an embodiment, the circuit element housing includes a substrate having first and second surfaces and a plurality of wire terminations disposed on at least one of the first and second surfaces, wherein the first, second and third terminals are each respectively comprised of one of the plurality of wire terminations.

In an embodiment, the overcurrent device is comprised of a fuse element electrically connected between the first and second terminals and disposed on at least one side of the substrate. The overvoltage device is comprised of a thyristor electrically connected between the second and third terminal and disposed on at least one side of the substrate.

In a further embodiment of the present invention, a circuit element is provided for overvoltage and overcurrent protection for circuitry in a telecommunications system. The circuit element includes a fuse element, a semiconductor overvoltage protection device, and a package configured as a discrete component that is mountable on a printed circuit board, the package containing the fuse element and the semiconductor overvoltage protection device.

In another embodiment, the package includes first, second and third terminals. In addition, the fuse element and the semiconductor overvoltage protection device both include corresponding first and second lead connections. The first terminal is connected to the first lead connection of the fuse element, the second terminal is connected the second lead connection of the fuse element and the first lead connection of the semiconductor overvoltage protection device and the third terminal is connected to the second lead connection of the semiconductor overvoltage protection device.

In a still further embodiment of the present invention, the invention provides a method for providing an overcurrent and overvoltage device in a telecommunications circuit. The method includes providing a housing configured to receive an overcurrent protection element and an overvoltage protection element, the housing having a plurality of terminals. The overcurrent and overvoltage protection elements are disposed within the housing such that the overcurrent protection element is electrically connected between first and second terminals of the plurality of terminals and the overvoltage protection element is electrically connected between the second terminal and a third terminal of the plurality of terminals. Finally, the housing is connected as a single discrete element to a circuit board that includes the telecommunications circuit.

In an embodiment, the method includes electrically connecting one of the first and second terminals to a first incoming line to the telecommunications circuit and electrically connecting the other of the first and second terminals to the telecommunications circuit such that the overcurrent protection element is connected in series with the telecommunications circuit, and electrically connecting the third terminal to a second incoming line to the telecommunications circuit such that the overvoltage protection element is connected in parallel with the telecommunications circuit.

In a further embodiment, the present invention provides an integral circuit protection device providing overcurrent and overvoltage protection for a circuit and configured to be connected to the circuit, wherein the device includes an overcurrent protection portion; an overvoltage protection portion, and a plurality of terminals for connecting both the overvoltage and overcurrent protection portions of the integral circuit protection device to the circuit to be protected, such that a part of the overvoltage protection portion also serves as one of the plurality of terminals.

In another embodiment, the integral circuit protection device further includes a second overcurrent protection portion, a second overvoltage protection portion, and fourth and fifth terminals as part of the plurality of terminals, wherein the second overcurrent protection portion is electrically connected between the fourth and fifth terminals, the second overvoltage protection portion is connected to the fifth terminal, a part of the second overvoltage protection portion jointly serves as the third terminal, and the third terminal is connected to ground.

In a further embodiment, an integrally formed bond pad and connector piece is connected between the second terminal and the overvoltage protection device.

In yet another embodiment of the present invention, a method is provided for an overcurrent and overvoltage device in a telecommunications circuit which includes the steps of: providing a mounting member configured to receive an overcurrent protection element and an overvoltage protection element, the mounting member having a plurality of terminals; disposing the overcurrent and overvoltage protection elements within the mounting member such that the overcurrent protection element is electrically connected between first and second terminals of the plurality of terminals, the overvoltage protection element is electrically connected to the second terminal, and a part of the overvoltage protection element serves as a third terminal of the plurality of terminals; and connecting the mounting member as a single discrete element to a circuit board that includes the telecommunications circuit.

In another embodiment, the method further includes providing the mounting member with both a second overcurrent protection element and a second overvoltage protection element, and disposing the second overcurrent and overvoltage protection elements within the mounting member such that the second overcurrent protection element is electrically connected between fourth and fifth terminals of the plurality of terminals and the second overvoltage protection element is electrically connected between the third and fifth terminals of the plurality of terminals.

Additional advantages and features of the present invention will become apparent upon reading the following detailed description of the presently preferred embodiments and appended claims, and upon reference to the attached drawings.

BRIEF DESCRIPTION OF THE FIGURES

Reference is made to the attached drawings, wherein elements having the same reference numeral represent like elements throughout and wherein.

DETAILED DESCRIPTION OF THE PRESENTLY PREFERRED EMBODIMENTS

The present invention provides a single discrete component that includes an overcurrent protection element and an overvoltage protection element enclosed by a common housing. Additionally the present invention provides methods of manufacturing same.

Figure 1:
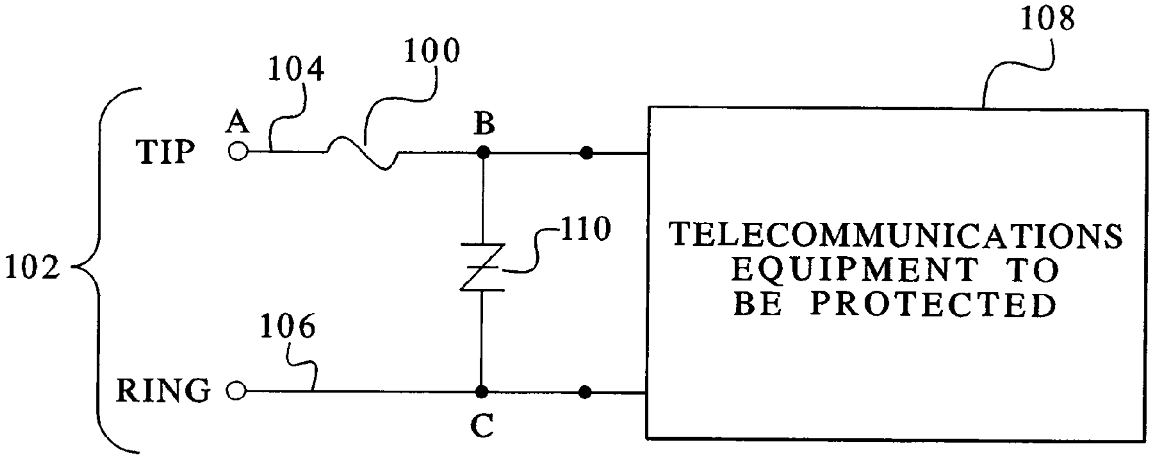
FIG.1 (PRIOR ART)
FIG. 1 is a schematic illustrating circuit connections for a conventional circuit protecting against overcurrent and overvoltage for telecommunication equipment.
Figure 2:
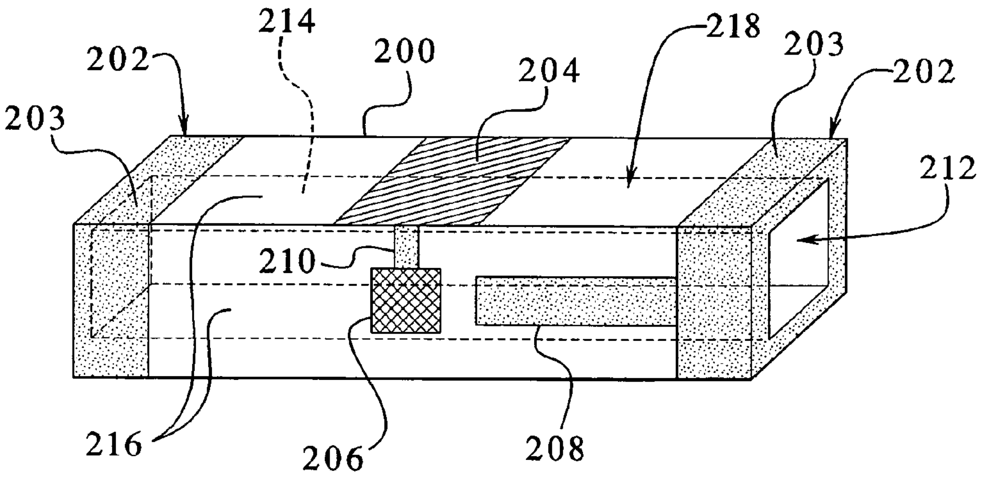
FIGS. 2–4 illustrate the construction steps for an integral overcurrent and overvoltage circuit element according to an embodiment of the present invention.
Figure 3:
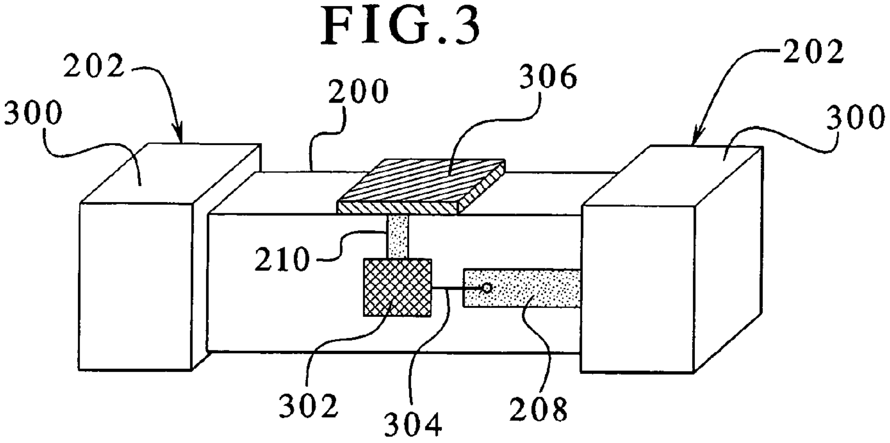
Figure 4:
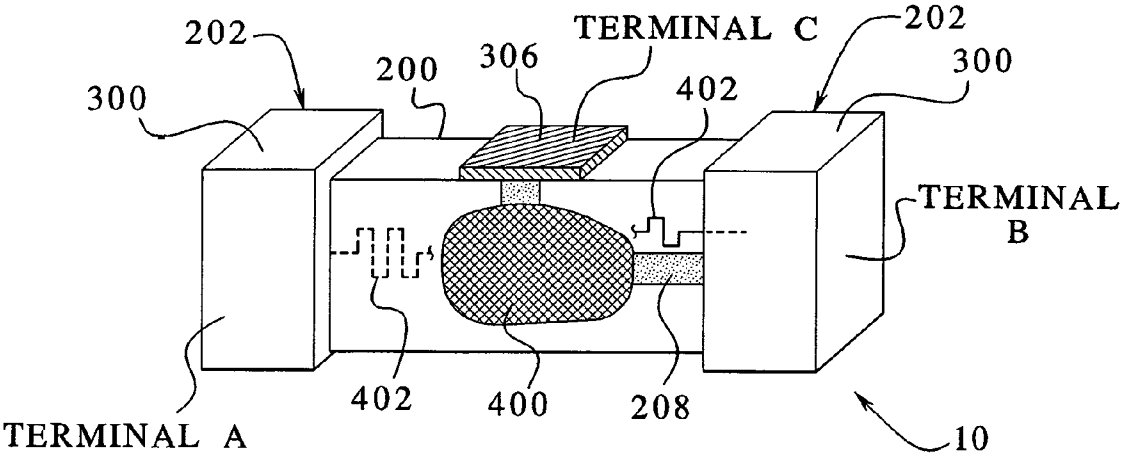

Referring now to the drawings, FIGS. 2–4 illustrate the construction of an overcurrent and overvoltage protection device 10 (shown in finished form in FIG. 4) according to an embodiment of the present invention that integrates fuse and thyristor components shown in FIG. 1 into a single, discrete circuit element. Hence, the circuit element shown in FIG. 4 has the same circuit arrangement as shown in FIG. 1, but includes both a fuse device and a semiconductor overvoltage device, preferably a bi-directional thyristor, in a common package.

As shown in FIG. 2, the circuit element is constructed of a tube 200 that is preferably hollow as indicated by hole 212. The hollow space 214 inside the tube accommodates a fuse element. The tube 200 is constructed of a material that is thermally conductive such as ceramic, for example, in order to dissipate heat energy released by a fuse element within the tube or a semiconductor thyristor element that is placed on an outer surface 216 of the tube. Each end of the tube 202 may include a surface metalization 203 that is disposed on the outer surface 216 of the tube end 202 and may extend around the end portions 202 into the inner hollow portion 214 of the tube 200. These metalizations 203 are used for electrically connecting terminals of a fuse element that is located within the inner hollow portion of the tube.

FIG. 2 also illustrates a die bond pad 206 that is disposed on the outer surface 216 of the tube 200. This die bond pad 206 is preferably a metalization that is used for bonding a thyristor to be placed on the outer surface 216 of the tube 200. This die bond pad 206 may be disposed on the tube 200 by various known methods such as screen printing, chemical vapor deposit or sputter. Additionally, a bond pad 208 is similarly disposed on the outer surface 216 of the tube 200, preferably on the same surface of a square tube as shown in FIGS. 2–4 as the die bond pad 206. The bond pad 208 is disposed so as to electrically contact the metalization 203 at least at one end of the tube 200. Tube 200 also includes a metalization 204 that will be used for placing a common terminal corresponding to terminal "C" as shown in FIG. 1.

In a preferred embodiment, the metalization 204 is placed on a side 218 of the tube 200 different from the die bond pad 206 and the bond pad conductor 208 due to space considerations. However, the metalization 204 can be placed on sides other than side 218. That is, in order to minimize the longitudinal length of the tube 200, it is preferable to utilize more than one side or surface of the tube 200 to place terminals and components. A metalization conductor 210 is included to electrically connect the die bond pad 206 to the metalization 204 that will later become a common terminal.

FIG. 3 illustrates the next step in construction of the circuit element of the present invention. Specifically, end caps 300, which facilitate connection of the circuit element to a printed circuit board in the telecommunications equipment being protected, are located on each end 202 of the tube 200 and electrically connect to the metalization 203 on each end of the tube 200 that, in turn, are connected to the two ends of the fuse element within the inner hollow portion 214 of the tube 200. In an alternate embodiment, metallization 203 may be omitted, in which case the end caps 300 connect directly with the fuse element and metallization 208.

FIG. 3 also illustrates the placement of a thyristor device 302 on the die bond pad 206. The thyristor 302 is bonded to the die bond pad 206 by methods commonly known in the art to provide thermal and electrical conductivity between the component and bond pad. Examples of such methods include soldering or affixing with conductive epoxy. Irrespective of the affixing type, the bonding method utilized must provide thermal and electrical conductivity between the thyristor and the bond pad that, in turn, thermally conducts with the tube 200 and electrically conducts to pad 206. This thermal conductivity allows heat energy generated during an overvoltage condition that causes current to flow in the thyristor to be dissipated by and throughout the tube 200. Dissipating heat from the thyristor 302 reduces the risk of damage to the thyristor 302 from heat energy released during its operation under overvoltage conditions.

Preferably, the thyristor 302 is constructed with a vertical structure that it is substantially flat having a cathode on one surface and an anode on the opposing surface. Accordingly, when the thyristor 302 is placed on the die bond pad 206, one of the cathode or anode is in electrical contact with the die bond pad 206 and the other opposing thyristor terminal (i.e., either the anode or cathode) faces away from the tube 200. Hence, connection with the opposing terminal to the bond pad 208 requires either a bond wire or a bond strap 304.

Finally, FIG. 3 illustrates a metal terminal 306 is disposed on the metalization 204 shown in FIG. 2, to form a common terminal corresponding to terminal C shown in FIG. 1.

FIG. 4 illustrates the finished circuit element including a fuse element 402 within the inner portion of the tube 200 and indicated by dashed lines to delineate its position within the tube 200. The fuse element 402 is connected between terminal A and terminal B, these terminals, in turn, being used to connect the fuse between the Tip line of a twisted pair and the telecommunications equipment being protected (i.e., 108 in FIG. 1). Furthermore, the bi-directional thyristor 302 is connected between terminals B and C via bond pad 208, bond wire 304, conductor 210 and metal terminal 306 (i.e., Terminal C). Hence, the bi-directional thyristor 302 can be connected in parallel with the telecommunications equipment 108 by connecting terminal B to the Tip line entering the equipment, terminal C, and the Ring line.

Additionally, FIG. 4 illustrates that the bi-directional thyristor 302 and bond wire or strap 304 are encapsulated by an encapsulant 400 in order to atmospherically seal the thyristor 302 from potentially degrading atmospheric conditions, such as moisture. Preferably, an epoxy encapsulant is used in sufficient quantity to totally encapsulate the thyristor 302 and the bond wire 304 from the outer surface of the tube 200. The circuit element may also include an insulated filling within the inner hollow portion 214 of the tube 200 around the fuse element 402 in order to suppress arcing energy occurring when the fuse element opens the circuit due to an overcurrent condition. The insulative filling can be comprised of a material such as sand, for example. It is noted that the fuse element 402 may be constructed according to any configuration known in the art. Specific constructions may include a spiral wire wound around a cylindrical core, a straight wire fuse or a metal link fuse.

Figure 5:
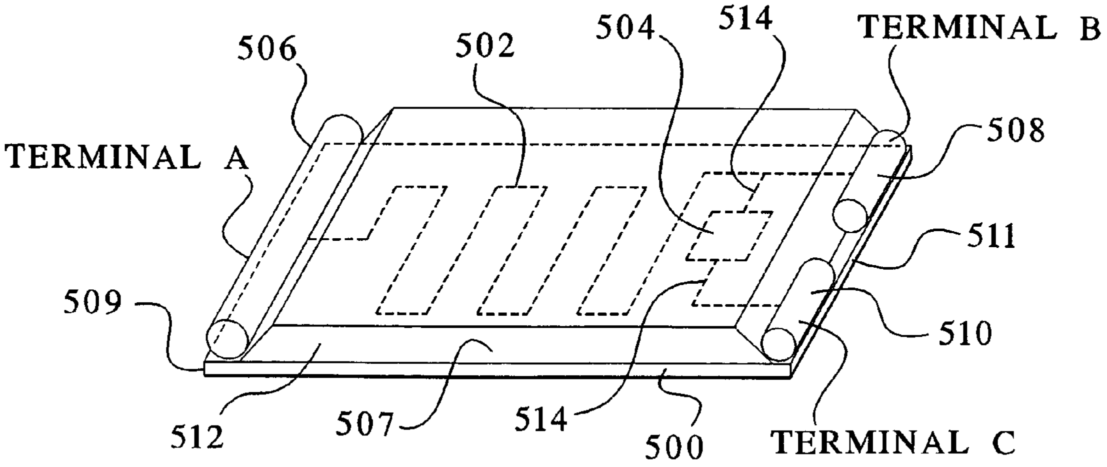
FIG. 5 illustrates a further integral overcurrent and overvoltage protection device according to an alternate embodiment of the present invention.

FIG. 5 illustrates an alternative embodiment of the present invention having a low profile that is advantageous for mounting a printed circuit board. The circuit element according to this embodiment includes a planar substrate 500 that is used for mounting the fuse and bi-directional thyristor elements thereon. Preferably, a fuse element 502 is bonded to a surface (i.e., surface 507 of FIG. 5) of the substrate 500 and electrically connected between a terminal 506 located adjacent to an edge (i.e., edge 509 of FIG. 5) of the substrate 500 and a terminal 508 located adjacent another edge (i.e., edge 511 of FIG. 5) of the substrate 500. Although FIG. 5 illustrates the fuse element and terminals disposed on a single side of the substrate 500, other embodiments can include fuse elements on both sides the substrate 500 and also terminals disposed on either side of the substrate 500 and on any portion thereof, not just adjacent to an edge.

Additionally, a bi-directional thyristor 504 is disposed on a surface (i.e., surface 507 of FIG. 5) of the substrate 500. Metalized terminals 514 connect the anode and cathode terminals of the thyristor 504 to terminals 508 and 510 corresponding to terminals B and C of the circuit of FIG. 1.

In a preferred embodiment, the fuse element 502 and bi-directional thyristor 504 are disposed on the same surface of the substrate 500, as are terminals 506, 508 and 510. Additionally, the fuse element 502 and bi-directional thyristor 504 are encapsulated within a encapsulant 512 to protect these elements from atmospheric conditions and also to contain energy dissipated by these elements during either overcurrent or overvoltage conditions. Furthermore, the substrate 500 is constructed of a thermally conductive material in order to draw heat away from components 502 and 504.

Preferably, for both disclosed embodiments, the thermal coefficients ($P_{CE}$) of the substrate 500 and the thyristor are substantially the same.

Figure 6:
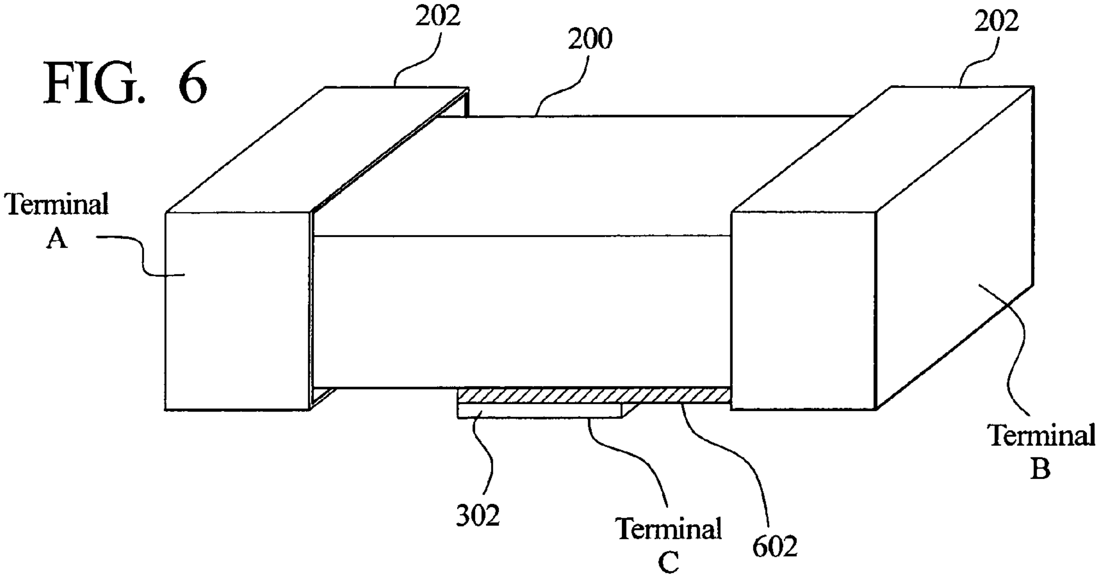
FIG. 6 illustrates a cuboid integral overcurrent and overvoltage circuit element according to an alternative embodiment of the present invention.

Referring now to FIG. 6, what is shown is yet another alternative embodiment of an overcurrent and overvoltage protection device of the present invention wherein the associated thyristor 302 also serves as Terminal C of the device. Similar to the embodiment shown in FIGS. 2–4, the overcurrent and overvoltage protection device shown in FIG. 6 includes the tube 200 and associated end portions 202. The two end portions 202 serve as Terminals A and B of the device.

FIG. 6 also illustrates an integrally-formed bond pad and connector piece 602 which is disposed on the bottom outer surface of the tube 200. This integrally-formed bond pad and connector piece 602 is preferably a metallization that is used both for bonding the thyristor 302 to the outer surface of the tube 200 and for connecting the integrally-formed bond pad and connector piece 602 to Terminal B. While the integrally-formed bond pad and connector piece 602 could, in fact, be formed as separate and discrete components (302, 304, 208) as with the embodiment shown in FIGS. 2–4, the preferred embodiment herein described offers a simpler design requiring reduced manufacturing outlay.

Figure 7:
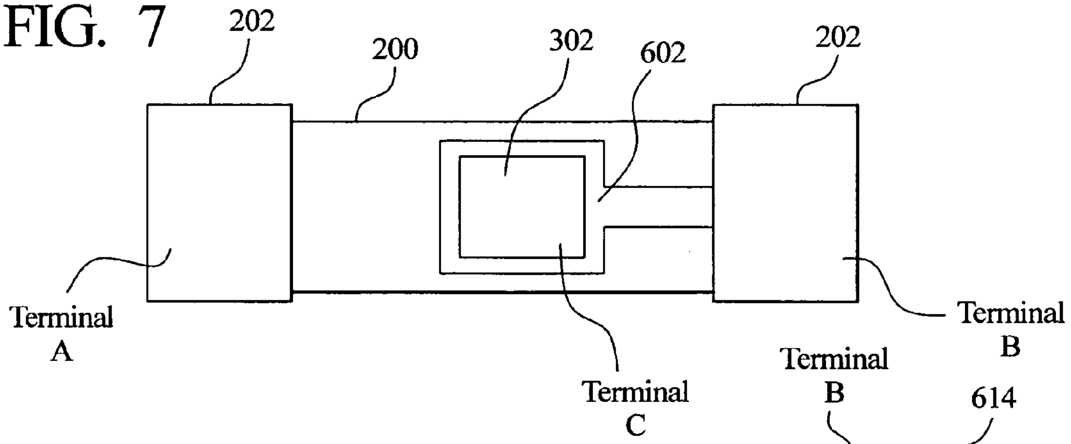
FIG. 7 illustrates a bottom view of the integral overcurrent and overvoltage protection device of FIG. 6.

FIG. 7 shows a bottom view of the overcurrent and overvoltage protection device from FIG. 6. The thyristor 302 is bonded to the integrally-formed bond pad and connector piece 602 by methods commonly known in the art to provide thermal and electrical conductivity therebetween. Upon affixation of the thyristor 302 to the integrally-formed bond pad and connector piece 602, one of the thyristor's cathode or anode is in electrical contact with the integrally-formed bond pad and connector piece 602 and the other opposing thyristor terminal (i.e., either the cathode or anode) faces away from the bottom surface of the tube 200 and thereby serves as Terminal C of the device. Thus, pursuant to the configuration of the overcurrent and overvoltage protection device shown in FIGS. 6 and 7, such device may be placed, bottom side down, upon an associated printed circuit board such that the printed circuit board is in direct contact with Terminals A, B and C. Since the thyristor 302 itself serves as Terminal C, the embodiment thus described alleviates the need to separately and additionally form the conductor 210 and metal terminal 306 as shown in the embodiment from FIGS. 2–4, for example. This configuration also lends itself to a simplified design requiring reduced manufacturing outlay as well as exhibits a generally lower circuit impedance due to the more direct electrical path between components.

Figure 8:
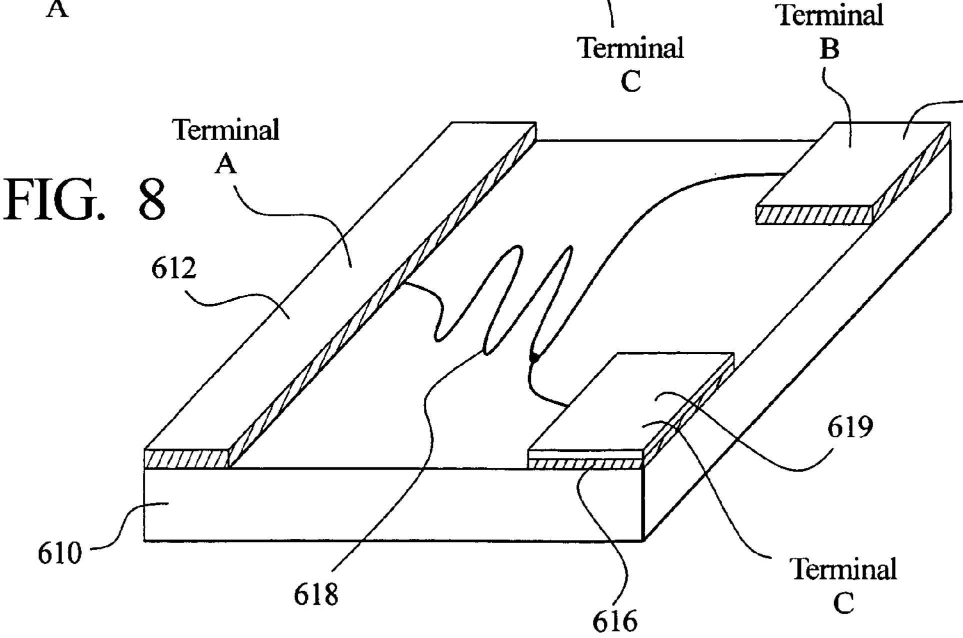
FIG. 8 illustrates a substantially planer integral overcurrent and overvoltage protection device according to another alternative embodiment of the present invention.

Turning to FIG. 8, another alternative embodiment of the present invention is shown having a lower profile which is advantageous for mounting upon a printed circuit board. The overcurrent and overvoltage protection device shown includes a planar substrate 610 that is used for mounting the fuse 618 and bi-directional thyristor element 619 thereon. Preferably, the fuse element 618 is bonded to a surface of the substrate 610 and electrically connected between a Terminal A 612 and both Terminals B and C located adjacent to an edge of the substrate 610. Both Terminal A 612 and Terminal B 614 are preferably mounted to the same surface of the substrate 610 as the fuse element 618. However, other embodiments of the present invention contemplate fuse elements on both sides of the substrate 610 as well as terminals disposed on either side of the substrate 610 and on any portion thereof, not just adjacent an edge.

The bi-directional thyristor 619 shown in FIG. 8 is bonded to the surface of the substrate 610 via an associated integrally-formed bond pad and connector piece 616. As with the thyristor 302 shown in FIGS. 6 and 7, the thyristor 619 shown in FIG. 8 also serves as Terminal C of the associated overcurrent and overvoltage protection device. The upwardly facing side of the device shown in FIG. 8 is actually the bottom surface whereby, upon turning the device over, Terminals A, B and C may be placed upon an associated printed circuit board for simultaneous contact therewith.

Figure 9:
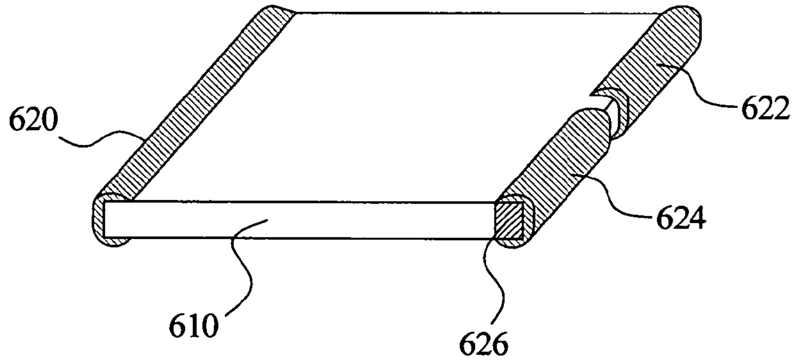
FIGS. 9–12 illustrate alternative terminal configurations for planer integral overcurrent and overvoltage protection devices according to alternative embodiments of the present invention.

FIGS. 9–12 offer alternative terminal configurations for the overcurrent and overvoltage protection device described with reference to FIG. 8. For example, Terminal A 620, Terminal B 622 and Terminal C 624 may wrap around the respectively associated edge of the substrate 610 as shown in FIG. 9. In addition, each of these terminals, for example Terminal C 624, could also wrap around an associated lateral edge of the substrate 610—as generally shown with shaded area 626.

Figure 10:
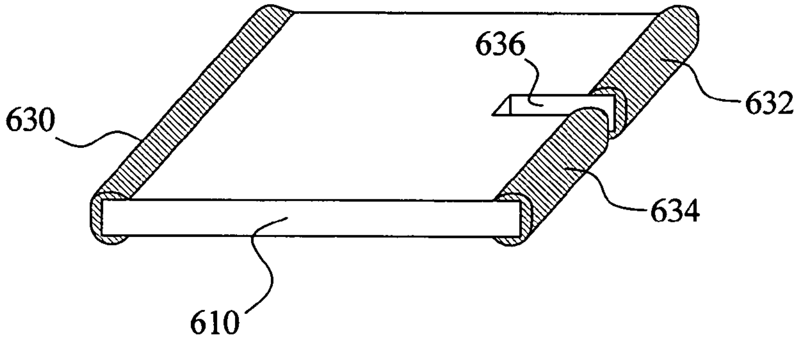

FIG. 10 offers a variation of the embodiment shown in FIG. 9 wherein an additional slot 636 is formed in the substrate 610 itself. Such variations are a result, generally, of preferred manufacturing processes.

Figure 11:
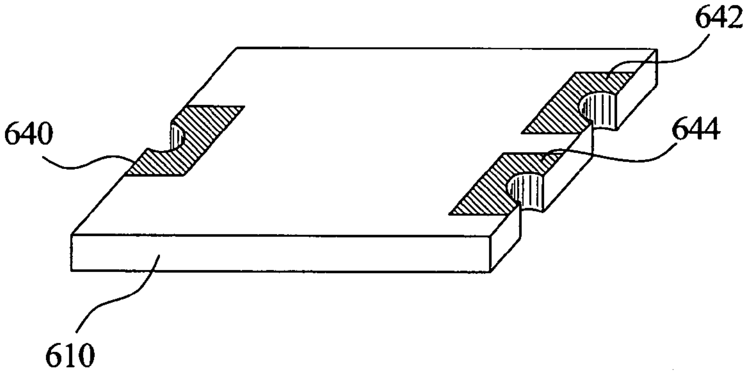
Figure 12:
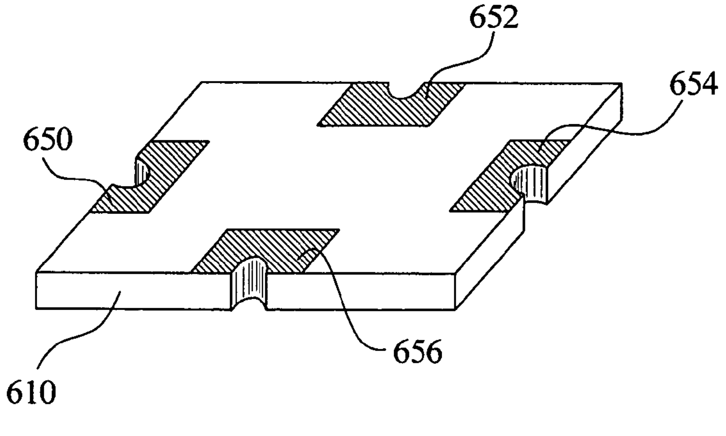

FIG. 11 offers yet another alternative terminal configuration for the overcurrent and overvoltage protection device wherein the terminals 640, 642 and 644 are formed as castellated contacts on respective edges of the substrate 610. Such contacts include metallized surfaces on both the top and bottom sides of the substrate 610 as well as metallized feed-through portions formed therebetween. As shown in FIG. 12, the associated terminals 650, 652, 654 and 656 may be formed on any or all of the respective sides of the substrate 610.

With respect to the embodiments shown in FIGS. 9–12, for example, it is within the contemplation of the present invention that the actual configuration and formation of the terminals of the associated overcurrent and overvoltage protection device should not be limited with respect to exact physical dimensions or placement upon the substrate. Indeed, many such variations are a result of a preferred fabrication process wherein individual overcurrent and overvoltage protection devices are ultimately cut from a much larger panel in a relatively late stage of an overall manufacturing process.

Figure 13:
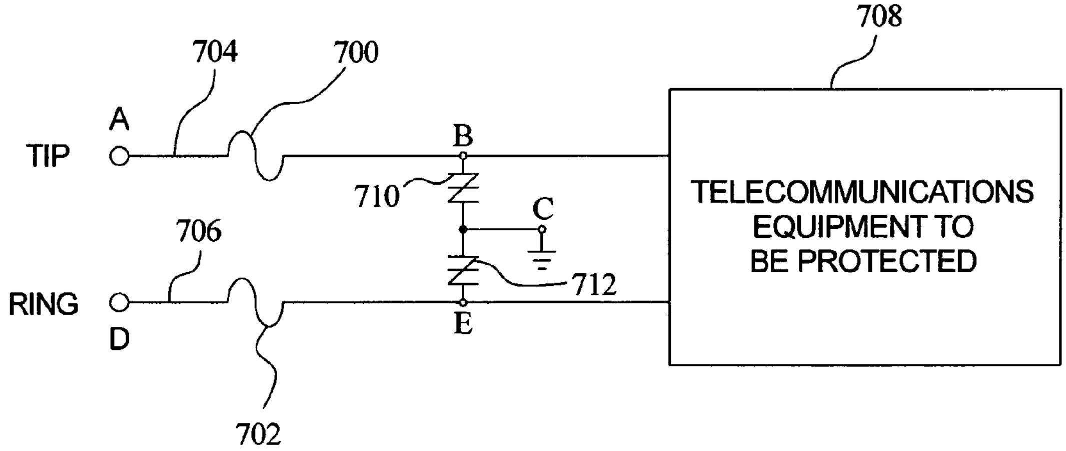
FIGS. 13 and 14 are schematics illustrating circuit connections for alternative conventional circuits protecting against overcurrent and overvoltage for telecommunication equipment which include references to ground.
Figure 14:
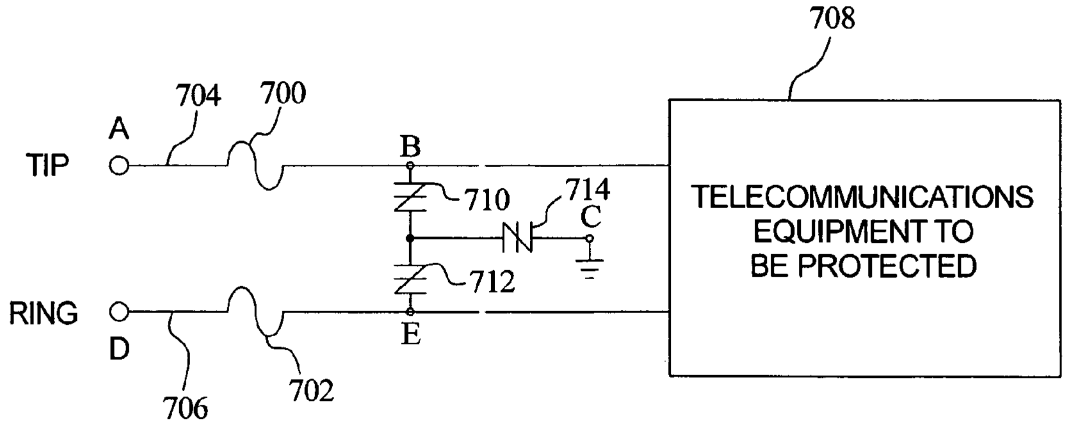

FIGS. 13 and 14 offer alternative circuit configurations for protecting against overcurrent and overvoltage in telecommunication equipment. Referring back to FIG. 1, what was shown was a very basic circuit for protecting against overcurrent and overvoltage wherein there is no reference to earth ground. Such might be the case, for example, when attempting to protect a modem. The configurations shown in FIGS. 13 and 14, conversely, are typically used in situations where, inside the equipment to be protected, there is a reference to earth ground. Thus, for example, should there be a lightning strike at the device such that there is a correspondingly high voltage spike on both the tip and ring lines, the equipment to be protected will view it as a high voltage with respect to ground. As such, it needs to be suppressed. Depending upon the particular equipment to be protected, either the circuit configuration of FIG. 13 or the circuit configuration of FIG. 14 might be encountered.

As shown in the circuit of FIG. 13, a second fuse element 702 and a second thyristor 712 are incorporated into the design of the associated overcurrent and overvoltage protection device. The overall configuration includes a fuse element 700 connected between Terminal A (in tip line 704) and Terminal B, a thyristor element 710 connected between Terminal B and Terminal C, fuse element 702 connected between Terminal D (in tip line 706) and Terminal E, thyristor 712 connected between Terminal E and Terminal C, and Terminal C connected to earth ground. In addition, in order to limit overcurrent and overvoltage conditions, the circuit is connected to a telecommunication system 708 via Terminals B and E.

The circuit of FIG. 14 differs from that shown in FIG. 13 in that it further includes yet another thyristor element 714 which is connected, on one side, to the connection between thyristors 710 and 712 and, on the other side, to earth ground. The physical embodiments of the circuit configurations shown in FIGS. 13 and 14 will now be discussed with reference to FIGS. 15–22.

Figure 15:
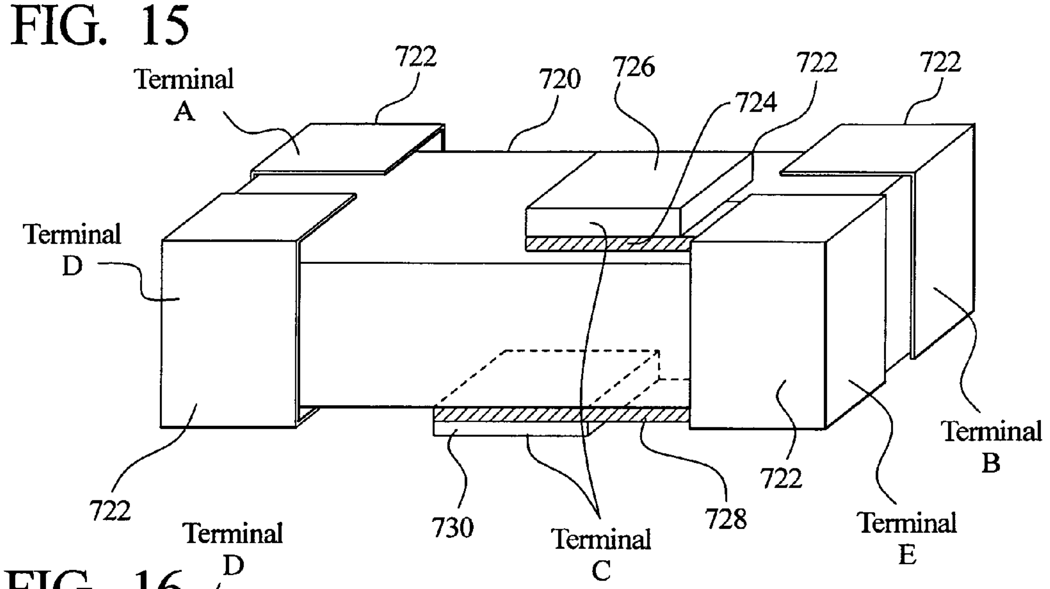
FIG. 15 illustrates an integral overcurrent and overvoltage circuit element according to an embodiment of the present invention associated with the schematic of FIG. 13.

FIG. 15 shows an embodiment of an overcurrent and overvoltage protection device of the present invention in accordance with the circuit of FIG. 13. Though the device has but a single tube 720, it includes four distinct end portions 722 which respectively represent Terminals A, B, D and E. In addition, the device includes two thyristor elements 726, 730 respectively mounted upon integrally-formed bond pad and connector pieces 724, 728.

Figure 16:
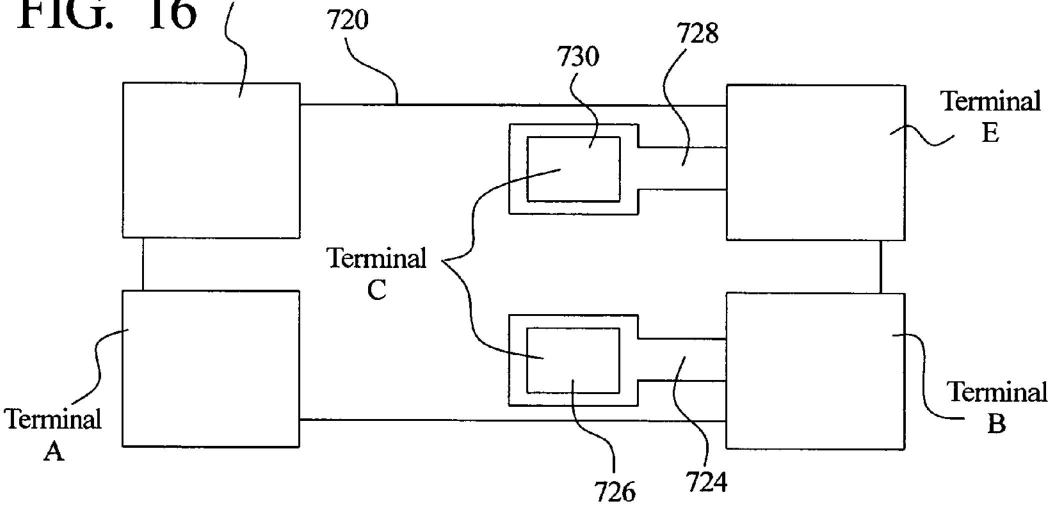
FIG. 16 illustrates a bottom view of the integral overcurrent and overvoltage circuit element of FIG. 15.

The bottom side of the overcurrent and overvoltage protection device of FIG. 15 is shown in FIG. 16. Here it can be seen that thyristor 726 is connected to Terminal B via the integrally-formed bond pad and connector piece 724 while thyristor element 730 is electrically connected to Terminal E via the integrally-formed bond pad and connector piece 728. In the present embodiment, the bottom surfaces of both thyristor elements 726, 730 serve as Terminal C of the associated device. That is, upon placement of the overcurrent and overvoltage protection device upon a printed circuit board, bottom side down, both bottom surfaces of thyristor elements 726, 730 would come in contact with a surface of the associated printed circuit board and be electrically connected to each other via, for example, an electrical line formed in the printed circuit board itself.

Figure 17:
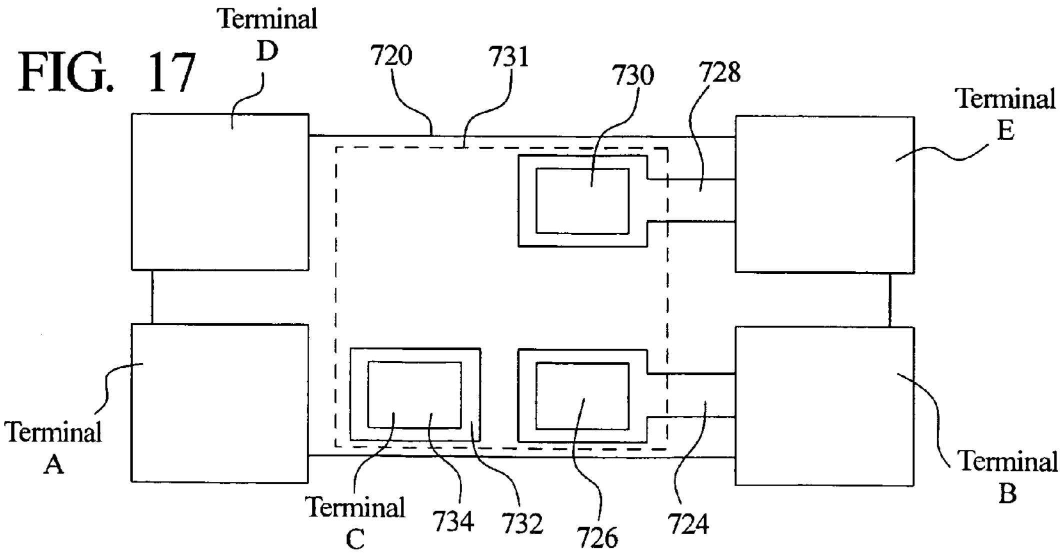
FIG. 17 illustrates a bottom view of an integral overcurrent and overvoltage circuit element of the present invention associated with the schematic of FIG. 14.

FIG. 17 represents an embodiment of the overcurrent and overvoltage protection device shown schematically in FIG. 14. Thus, it further includes a third thyristor element 734 mounted upon an associated integrally-formed bond pad and connector piece 732. In this case, the bottom-facing surface of the thyristor element 734 (one of the cathode or anode) will be electrically connected to the bottom-facing surfaces of both thyristor elements 726, 730 via, for example, another electrical line in the associated printed circuit board. The opposite side of the thyristor element 734 (i.e., either the anode or cathode) is bonded to the integrally formed bond pad and connector piece 732 which, in turn, will serve as Terminal C of the device. Alternatively, thyristor elements 726, 730, 734 could be mounted on a single die pad 731 as opposed to their respective integrally-formed bond pad and connector pieces 724, 728, 732. Such bond pad 731 would provide the common electrical connection point between the three thyristor elements 726, 730, 734. Thereafter, upon placement of the overcurrent and overvoltage protection device upon a printed circuit board, bottom side down, the respective bottom surfaces of thyristor elements 726, 730, 734 would come in contact with a surface of the associated printed circuit board whereupon, via electrical lines formed in the printed circuit board, for example, thyristor element 726 would be electrically connected to Terminal B, thyristor element 730 would be electrically connected to Terminal E, and thyristor element 734 would be electrically connected to Terminal C.

Figure 18:
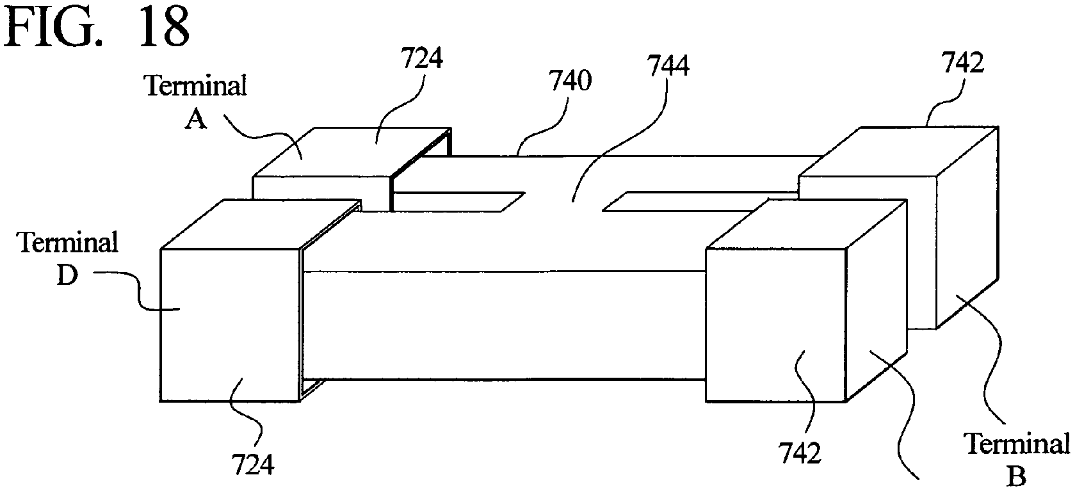
FIG. 18 illustrates an integral overcurrent and overvoltage circuit element of the present invention associated with the schematic of FIG. 13.

Turning now to FIG. 18, what is shown is an overcurrent and overvoltage protection device of the present invention which is very similar to that shown in FIG. 15. The difference, however, is that the device shown in FIG. 18 is, essentially, a physical combination of two individual devices as taken from FIG. 7, for example. The body 740 of this device has a substantially "H" shape whereby the two main body cavities are joined by a beam or structural member 744. It is within the contemplation of the present invention that such body 740 could be either a single molded or pressed part.

Figure 19:
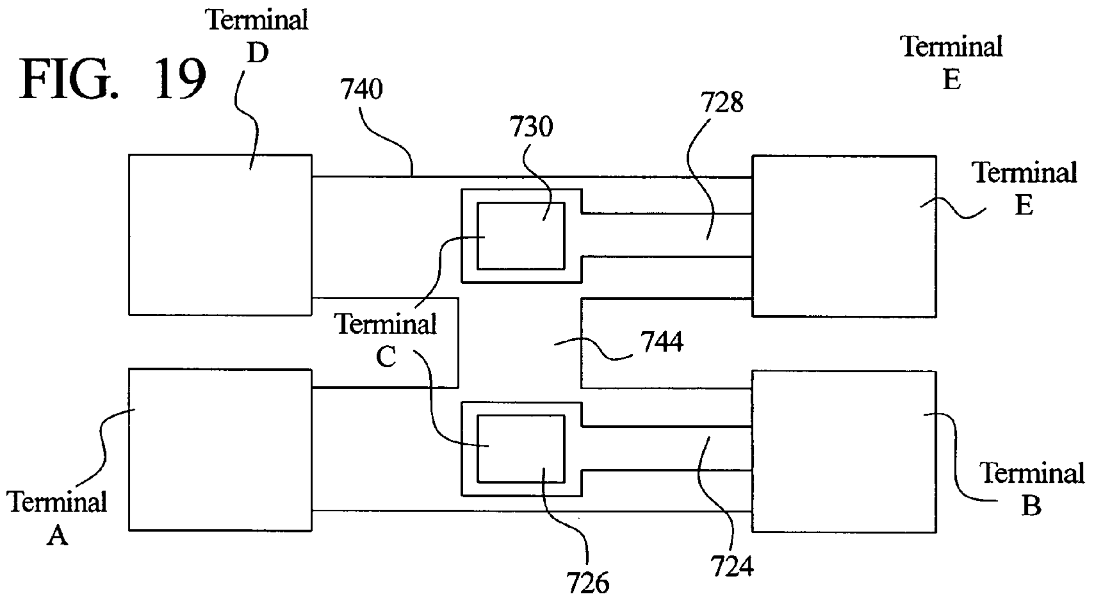
FIG. 19 illustrates a bottom view of the integral overcurrent and overvoltage circuit element shown in FIG. 18.

FIG. 19 shows a bottom side of the overcurrent and overvoltage protection device from FIG. 18 wherein, again, it can be seen that the bottom-facing surfaces of thyristors 726, 730 also serve as Terminal C of the device.

Figure 20:
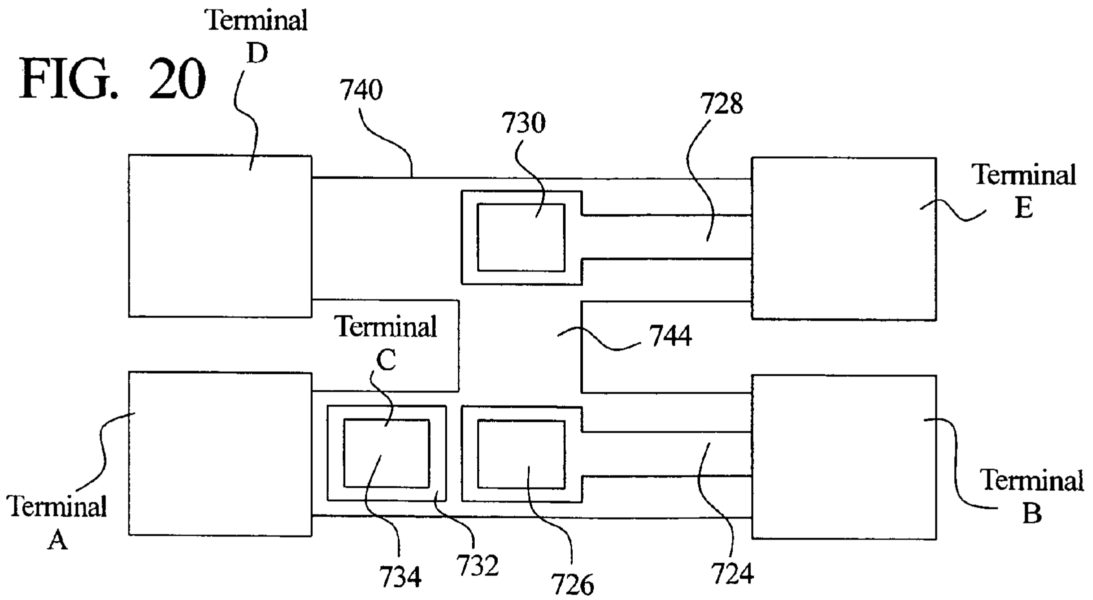
FIG. 20 illustrates a bottom view of an integral overcurrent and overvoltage circuit element of the present invention associated with the schematic shown in FIG. 14.

FIG. 20 shows an alternative embodiment of the present invention which includes the third thyristor element 734 mounted on the H-shaped body 740.

Figure 21:
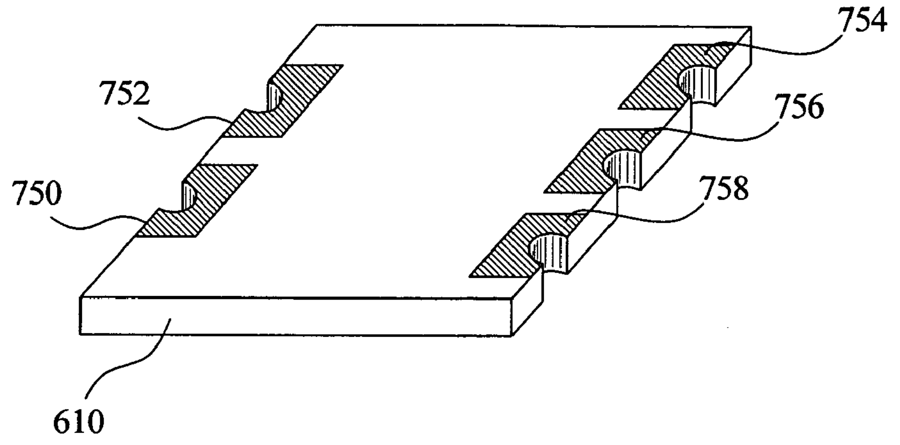
FIGS. 21 and 22 illustrate alternative terminal configurations for planer integral overcurrent and overvoltage circuit elements according to further alternative embodiments of the present invention.
Figure 22:
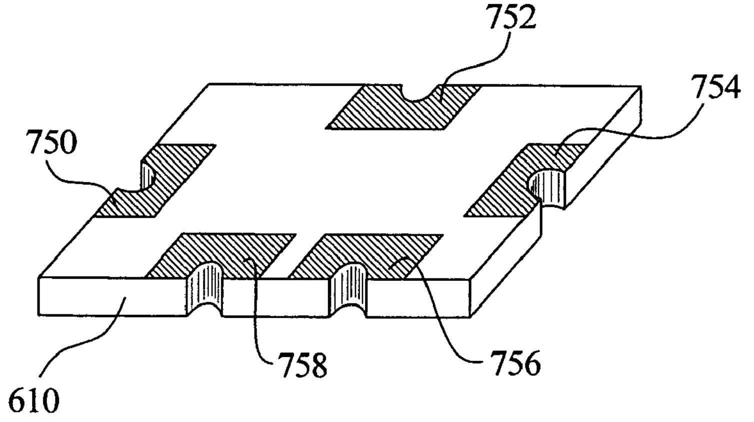

FIGS. 21 and 22 offer alternative terminal configurations with respect to the multiple thyristor embodiments of the present invention discussed with reference to FIGS. 13 and 14. As shown in FIG. 21, multiple terminals 750, 752, 754, 756 and 758 may be formed at various edge areas of an associated substrate 610. Indeed, as shown in FIG. 22, such terminals 750, 752, 754, 756 and 758 could well be formed at any or all of the four side edges of the associated substrate 610.

The common packaging of the overcurrent protective fuse element and the overvoltage protective thyristor element of the present invention provides the assurance that these components are properly coordinated and matched. For example, given a telecommunication circuit requiring protection of overvoltages of 600 volts or greater and short circuit conditions of 40 amps or greater, the thyristor and fuse elements can be selected accordingly and incorporated into a common package. Thus, for specific telecommunications circuits, the common circuit element of the present invention is constructed such that the thyristor and fuse elements meet regulatory and safety requirements for particular circuits without the need to ensure that both components are properly coordinated and matched as required in the prior art discrete component approach.

Additionally, by incorporating the fuse element and thyristor in a common package, the additional space requirements for two discrete component packages is eliminated, thereby reducing the physical space needed in a telecommunication circuit for overvoltage and overcurrent circuit protection. Moreover, an integrated overvoltage and overcurrent circuit element avoids problems associated with separately sourcing components and interconnecting those components made by different suppliers. This approach further reduces the cost of the final product since a single manufacturer supplies a singular overvoltage and overcurrent circuit protection element.

Reducing costs and complexity even further is the embodiment of the present invention which uses one or more thyristor elements of the overcurrent and overvoltage protection device as Terminal C. Indeed, to the extent that the fabrication of the device is substantially directed to only one side, manufacturing costs again likely would be reduced. Such a configuration also offers lower circuit impedance given the more direct path between components.

It should be understood that various changes and modifications to the presently preferred embodiments described herein will be apparent to those skilled in the art. Such changes and modifications can be made without departing from the spirit and scope of the present invention and without diminishing its attended advantages. It is therefore intended that such changes and modifications be covered by the appended claims.

What is claimed is:

1. An integral circuit protection device providing overcurrent and overvoltage protection for a circuit and configured to be connected to the circuit, comprising:

an overcurrent protection portion;

an overvoltage protection portion having an at least partially conductive surface; and a plurality of terminals for connecting both the overvoltage and overcurrent protection portions of the integral circuit protection device to the circuit to be protected, wherein the at least partially conductive surface of the overvoltage protection portion serves as one of the plurality of terminals, wherein the circuit protection device is formed as a discrete component for mounting on a printed circuit board, and wherein the plurality of terminals contact a surface of the printed circuit board upon placement thereon.

2. The integral circuit protection device of claim 1, wherein the plurality of terminals includes first, second and third terminals, the part of the overvoltage protection portion serving as one of the plurality of terminals being the third terminal, the overcurrent protection portion being electrically connected between the first and second terminals, and the overvoltage protection portion being connected to the second terminal.

3. The integral circuit protection device of claim 1, wherein the overcurrent protection portion includes a fuse.

4. The integral circuit protection device of claim 1, wherein the overvoltage protection portion includes a bi-directional thyristor.

5. The integral circuit protection device of claim 1, wherein the plurality of terminals are configured to electrically connect the overcurrent protection portion in series with the circuit to be protected and to electrically connect the overvoltage protection portion in parallel with the circuit to be protected when the integral circuit protection device is electrically connected to the circuit to be protected.

6. The integral circuit protection device of claim 1, further comprising:
- a thermally conductive portion that conducts heat away from the overvoltage protection portion.

7. The integral circuit protection device of claim 6, wherein thermal coefficients of the thermally conductive portion and overvoltage protection portion are substantially the same.

8. The integral circuit protection device of claim 2, wherein the first, second and third terminals are formed on at least one same side of the integral circuit protection device.

9. The integral circuit protection device of claim 1, wherein the integral circuit protection device is configured for mounting on a printed circuit board.

10. The integral circuit protection device of claim 1, wherein the integral circuit protection device is configured substantially the same as a standard telecommunications fuse configuration.

11. The integral circuit protection device of claim 2, further comprising:
- a second overcurrent protection portion;
- a second overvoltage protection portion;
- fourth and fifth terminals as part of the plurality of terminals; and
- wherein the second overcurrent protection portion is electrically connected between the fourth and fifth terminals, the second overvoltage protection portion is connected to the fifth terminal, a part of the second overvoltage protection portion jointly serves as the third terminal, and the third terminal is connected to ground.

12. The integral circuit protection device of claim 11, further comprising:
- a third overvoltage protection portion connected between the third terminal and ground.

13. A circuit element for overvoltage and overcurrent protection of a circuit, comprising:
- a circuit element mounting member having first, second and third terminals, wherein the circuit element is formed as a discrete component for mounting on a printed circuit board, and wherein the first, second and third terminals contact a surface of the printed circuit board upon placement thereon;
- an overcurrent protection device electrically connected between the first and second terminals, the overcurrent protection device being contained by the circuit element mounting member; and
- an overvoltage protection device electrically connected to the second terminal and being contained by the circuit element mounting member, wherein a part of the overvoltage protection portion is conductive and serves as the third terminal.

14. The circuit element of claim 13, wherein the circuit element mounting member is further comprised of a tube having an outer surface and an inner hollow portion;
- wherein the overcurrent protection device is disposed within the inner hollow portion of the tube, and each of the overvoltage protection device, the first terminal and the second terminal is disposed on the outer surface of the tube.

15. The circuit element of claim 13, wherein the overcurrent protection device is a fuse configured to protect the circuit from excessive currents.

16. The circuit element of claim 13, wherein the overvoltage protection device is a thyristor configured to protect the circuit from excessive voltages.

17. The circuit element of claim 14, wherein the tube further has a first end and a second end, the first terminal being disposed at the first end, and the second terminal being disposed at the second end opposite from the first terminal.

18. The circuit element of claim 17, wherein the first and second terminals include electrically conductive layers disposed on the outer surface of the tube adjacent to each of the first and second ends and extending into part of the inner hollow portion adjacent to the first and second ends;
- wherein conductive end caps respectively cover the electrically conductive layers and the first and second ends and are electrically connected to the electrically conductive layers; and
- wherein the electrically conductive layers are electrically connected to the overcurrent device disposed within the inner hollow portion of the tube.

19. The circuit element of claim 13, further comprising:
- an integrally formed bond pad and connector piece connected between the second terminal and the overvoltage protection device.

20. The circuit element of claim 13, wherein the overcurrent device is electrically connected in series with the circuit to be protected and the overvoltage protection device is electrically connected in parallel with the circuit to be protected.

21. The circuit element of claim 13, wherein the circuit element mounting member further comprises:
- a substrate having first and second surfaces; and
- a plurality of wire terminations disposed on at least one of the first and second surfaces, wherein at least the first and second terminals are each respectively comprised of one of the plurality of wire terminations.

22. The circuit element of claim 21, wherein the overcurrent protection device is comprised of a fuse element electrically connected between the first and second terminals and disposed on at least one side of the substrate, and the overvoltage protection device is comprised of a thyristor electrically connected to the second terminal and disposed on at least one side of the substrate.

23. The circuit element of claim 21, further comprising:
- an atmospherically resistant encapsulant disposed on at least one side of the substrate and having a fuse element and thyristor therebetween.

24. The circuit element of claim 21, wherein the first, second and third terminals are formed on at least a same side of the circuit element.

25. The circuit element of claim 21, further comprising:

an integrally formed bond pad and connector piece connected between the second terminal and the overvoltage protection device.

26. The circuit element of claim 13, wherein the circuit element mounting member is comprised of a thermally conductive material.

27. The circuit element of claim 14, further comprising:

a second overcurrent protection device;

a second overvoltage protection device;

fourth and fifth terminals; and wherein the second overcurrent protection device is electrically connected between the fourth and fifth terminals, the second overvoltage protection device is connected to the fifth terminal, a part of the second overvoltage protection device jointly serves as the third terminal, and the third terminal is connected to ground.

28. The integral circuit device of claim 27, further comprising:

a third overvoltage protection device connected between the third terminal and ground.

29. A method for providing an overcurrent and overvoltage device in a telecommunications circuit, the method comprising the steps of:

providing a mounting member configured to receive an overcurrent protection element and an overvoltage protection element, the mounting member having a plurality of terminals;

disposing the overcurrent and overvoltage protection elements within the mounting member such that the overcurrent protection element is electrically connected between first and second terminals of the plurality of terminals, the overvoltage protection element is electrically connected to the second terminal, and a part of the overvoltage protection element is conductive and serves as a third terminal of the plurality of terminals;

connecting the mounting member as a single discrete element to a circuit board that includes the telecommunications circuit;

electrically connecting one of the first and second terminals to a first incoming line to the telecommunications circuit and electrically connecting the other of the first and second terminals to the telecommunications circuit such that the overcurrent protection element is connected in series with the telecommunications circuit; and electrically connecting the third terminal to a second incoming line to the telecommunications circuit such that the overvoltage protection element is connected in parallel with the telecommunications circuit.

30. The method of claim 29, further comprising the steps of:

providing the mounting member with both a second overcurrent protection element and a second overvoltage protection element; and disposing the second overcurrent and overvoltage protection elements within the mounting member such that the second overcurrent protection element is electrically connected between fourth and fifth terminals of the plurality of terminals and the second overvoltage protection element is electrically connected between the third and fifth terminals of the plurality of terminals.

31. The method of claim 30, further comprising the step of:

providing the mounting member with a third overvoltage protection element; and disposing the third overvoltage protection element within the mounting member such that the third overvoltage protection element is electrically connected between the third terminal and ground.

* * * * *